US011881005B2

(12) United States Patent
Nagao et al.

(10) Patent No.: US 11,881,005 B2
(45) Date of Patent: Jan. 23, 2024

(54) IMAGE PROCESSING DEVICE, IMAGE PROCESSING METHOD, AND IMAGE PROCESSING PROGRAM

(71) Applicant: Nippon Telegraph and Telephone Corporation, Tokyo (JP)

(72) Inventors: Jiro Nagao, Tokyo (JP); Mariko Yamaguchi, Tokyo (JP); Hidenobu Nagata, Tokyo (JP); Kota Hidaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 528 days.

(21) Appl. No.: 17/264,986

(22) PCT Filed: Jul. 31, 2019

(86) PCT No.: PCT/JP2019/030050
§ 371 (c)(1),
(2) Date: Feb. 1, 2021

(87) PCT Pub. No.: WO2020/027210
PCT Pub. Date: Feb. 6, 2020

(65) Prior Publication Data
US 2021/0327069 A1    Oct. 21, 2021

(30) Foreign Application Priority Data
Aug. 3, 2018  (JP) .................................. 2018-146622

(51) Int. Cl.
*G06T 7/11* (2017.01)
*G06T 7/194* (2017.01)
(Continued)

(52) U.S. Cl.
CPC .............. *G06V 10/143* (2022.01); *G06T 7/11* (2017.01); *G06T 7/194* (2017.01); *G06V 10/25* (2022.01); *G06V 10/28* (2022.01)

(58) Field of Classification Search
CPC ......... G06T 7/11; G06T 7/194; G06V 10/143; G06V 10/25; G06V 10/28
See application file for complete search history.

(56) References Cited

U.S. PATENT DOCUMENTS

| 2008/0013793 | A1* | 1/2008 | Hillis ..................... G06V 40/28 382/114 |
| 2008/0246777 | A1* | 10/2008 | Swanson ................ H04N 5/272 348/E5.029 |

(Continued)

FOREIGN PATENT DOCUMENTS

| JP | H114381 | 1/1999 |
| JP | 2000-230809 | 8/2000 |

(Continued)

OTHER PUBLICATIONS

Conaire et al. ("Background Modelling in Infrared and Visible Spectrum Video for People Tracking," IEEE Computer Society Conference on Computer Vision and Pattern Recognition—Workshops; Date of Conference: Sep. 21-23, 2005) (Year: 2005).*

(Continued)

*Primary Examiner* — Yubin Hung
(74) *Attorney, Agent, or Firm* — Fish & Richardson P.C.

(57) ABSTRACT

It is possible to inhibit deterioration of extraction precision of a subject and reliably extract the subject even when colors of the subject and a background are the same or similar. An image processing device 1 includes an input unit 11 configured to input a first invisible light image of only a background in which a subject is not included and a second invisible light image in which the subject and the background are included and a subject region extraction unit 15 configured to calculate a difference between a pixel value of each pixel of the second invisible light image and a pixel value of a corresponding pixel of the first invisible light image, determine whether the pixel is in a subject region or a background region in accordance with whether the difference is equal to or greater than a predetermined threshold, and extract the subject region from the second invisible light image. The first and second invisible light images are images captured in an environment in which an invisible light (Continued)

irradiation device is disposed so that invisible light is radiated to the background and the invisible light is not radiated to the subject.

16 Claims, 6 Drawing Sheets

(51) Int. Cl.
*G06V 10/143* (2022.01)
*G06V 10/25* (2022.01)
*G06V 10/28* (2022.01)

(56) References Cited

U.S. PATENT DOCUMENTS

2017/0112577 A1* 4/2017 Bonutti ................ A61B 90/361
2018/0332239 A1* 11/2018 Peterson .................. G06T 7/11

FOREIGN PATENT DOCUMENTS

| JP | 2001-357388 | | 12/2001 | |
|---|---|---|---|---|
| JP | 2004-312402 | | 11/2004 | |
| JP | 2009-74836 | | 4/2009 | |
| JP | 2009-164951 | | 7/2009 | |
| JP | 2011010258 | A * | 1/2011 | |
| KR | 20160058607 | A * | 11/2014 | |
| WO | WO-9727702 | A1 * | 7/1997 | ............. G03B 17/53 |

OTHER PUBLICATIONS

Yao et al. ("An infrared small and dim target detection algorithm based on the mask image," IEEE 10th International Conference on Electronic Measurement & Instruments; Date of Conference: Aug. 16-19, 2011) (Year: 2011).*

Yoshida, "Background Differencing Technique Based on the Status of Reference Pixels," Journal of the Institute of Electronics, Information and Communication Engineers, 2005, J88-A(11):1226-1234, 22 pages (with English Translation).

* cited by examiner

IMAGE PROCESSING DEVICE, IMAGE PROCESSING METHOD, AND IMAGE PROCESSING PROGRAM

CROSS-REFERENCE TO RELATED APPLICATIONS

This application is a National Stage application under 35 U.S.C. § 371 of International Application No. PCT/JP2019/030050, having an International Filing Date of Jul. 31, 2019, which claims priority to Japanese Application Serial No. 2018-146622, filed on Aug. 3, 2018. The disclosure of the prior application is considered part of the disclosure of this application, and is incorporated in its entirety into this application.

TECHNICAL FIELD

The present invention relates to an image processing device, an image processing method, and an image processing program extracting a subject from an image.

BACKGROUND ART

To combine subjects such as people captured by cameras with other scenery, CGs, or the like in real time, it is necessary to rapidly extract only the subjects from images captured by the cameras.

As one scheme of rapidly extracting subjects from images captured by cameras, there is a background differentiation method. NPL 1 discloses a technology for dynamically controlling a threshold used to determine whether each pixel is in a subject or a background in a color image or a monochromatic image on the basis of a determination state of a reference pixel located near a target pixel.

CITATION LIST

Non Patent Literature

[NPL 1] Yoshida Toshiyuki, "Background Differencing Technique Based on the Status of Reference Pixels," IEICE TRANSACTIONS on Fundamentals of Electronics, Communications and Computer Sciences Journal A Vol. J88-A No. 11 pp 1226 to 1234

SUMMARY OF THE INVENTION

Technical Problem

In NPL 1, a threshold used to determine whether something is a subject or a background is dynamically controlled. However, when colors of the subject and the background are the same or similar, a problem in which erroneous determination easily occurs and extraction precision of the subject deteriorates may arise.

The technology of the present invention has been devised in view of the foregoing circumstances and an objective of the present invention is to inhibit deterioration of extraction precision of a subject and reliably extract the subject even when colors of the subject and a background are the same or similar.

Means for Solving the Problem

To achieve the foregoing objective, according to an aspect of the present invention, there is provided an image processing device including: an input unit configured to input a first invisible light image of only a background in which a subject is not included and a second invisible light image in which the subject and the background are included; and a subject region extraction unit configured to calculate a difference between a pixel value of each pixel of the second invisible light image and a pixel value of a corresponding pixel of the first invisible light image, determine whether the pixel is in a subject region or a background region in accordance with whether the difference is equal to or greater than a predetermined threshold, and extract the subject region from the second invisible light image. The first and second invisible light images are images captured in an environment in which an invisible light irradiation device is disposed so that invisible light is radiated to the background and the invisible light is not radiated to the subject.

According to another aspect of the present invention, there is provided an image processing method performed by an image processing device. The method includes: inputting a first invisible light image of only a background in which a subject is not included and a second invisible light image in which the subject and the background are included; calculating a difference between a pixel value of each pixel of the second invisible light image and a pixel value of a corresponding pixel of the first invisible light image; and determining whether the pixel is in a subject region or a background region in accordance with whether the difference is equal to or greater than a predetermined threshold, and extracting the subject region from the second invisible light image. The first and second invisible light images are images captured in an environment in which an invisible light irradiation device is disposed so that invisible light is radiated to the background and the invisible light is not radiated to the subject.

According to still another aspect of the present invention, there is provided an image processing program causing a computer to function as the image processing device.

Effects of the Invention

According to the present invention, it is possible to inhibit deterioration of extraction precision of a subject and reliably extract the subject even when colors of the subject and a background are the same or similar.

DESCRIPTION OF EMBODIMENTS

Hereinafter, embodiments of the present invention will be described in detail with reference to the drawings.

In the embodiments, infrared light is used as invisible light. Therefore, in the embodiments, an infrared camera is used as an invisible light imaging device that detects invisible light and captures an invisible light image, and an infrared lamp is used as an invisible light irradiation device that radiates invisible light. However, the present invention is not limited to infrared light. When invisible light (for example, ultraviolet light) other than infrared light is used, an invisible light camera and an invisible light lamp corresponding to the invisible light is assumed to be used.

Figure 1:
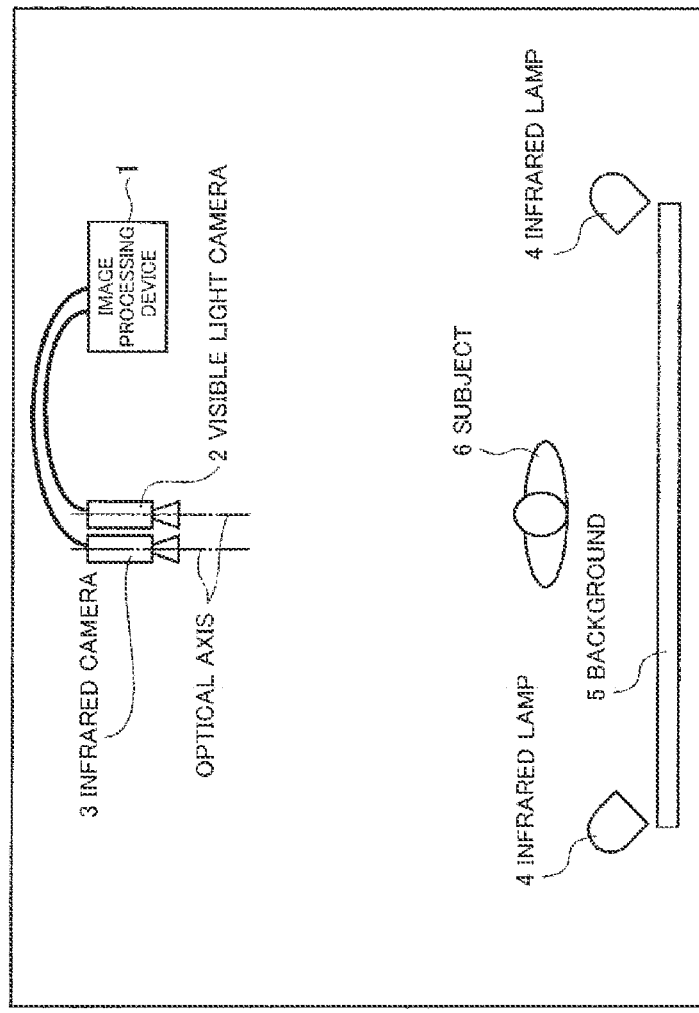
FIG. 1 is a diagram illustrating an overall configuration of an image processing system according to an embodiment of the present invention.

FIG. 1 is a diagram illustrating an example of a device configuration of an image processing system according to an embodiment of the present invention. The illustrated image processing system includes an image processing device 1, a visible light camera 2, an infrared camera 3, and an infrared lamp 4.

The visible light camera 2 is a camera that detects light seen by human eyes (visible light) and captures a visible light image (for example, a color image, a monochromatic image, or the like). The infrared camera 3 is a camera that detects infrared light which is one type of light unseen by human eyes (invisible light) and captures an infrared image.

The visible light camera 2 and the infrared camera 3 are installed as closely as possible so that optical axes are parallel, as illustrated in FIG. 1. The visible light image and the infrared image output from the visible light camera 2 and the infrared camera 3 are input to the image processing device 1.

The infrared lamp 4 (an invisible light irradiation device) radiates infrared light to a background 5. The infrared lamp 4 is disposed (adjusted) so that the invisible light is radiated to the background 5 and the invisible light is not radiated to the subject 6. In the illustrated example, two infrared lamps 4 are disposed at both ends in front of the background 5, but the number of infrared lamps 4 and the positions of the infrared lamps 4 are not limited thereto.

An infrared image captured by the infrared camera 3 has overall high pixel values in a background region irradiated with the infrared light and has overall low pixel values in a subject region not directly irradiated with the infrared light without being involved in color or light and shade of visible light illumination, when the infrared lamp 4 is used. Thus, it is easy to determine the background and the subject in the infrared image, and thus it is possible to reduce erroneous extraction of a subject.

The infrared image is not affected by colors of an illumination change in the visible light (a light and shade change and a color change) and the colors of the subject and the background. Therefore, even when the colors in the visible light in the subject and the background are the same or similar, it is possible to improve extraction precision of the subject region.

In the embodiment, because it is necessary to screen the subject from the infrared light, it is preferable not to use an illuminator (a light bulb or the like) emitting infrared light other than the infrared lamp 4 in an indoor environment in which there is no sunlight.

Figure 2:
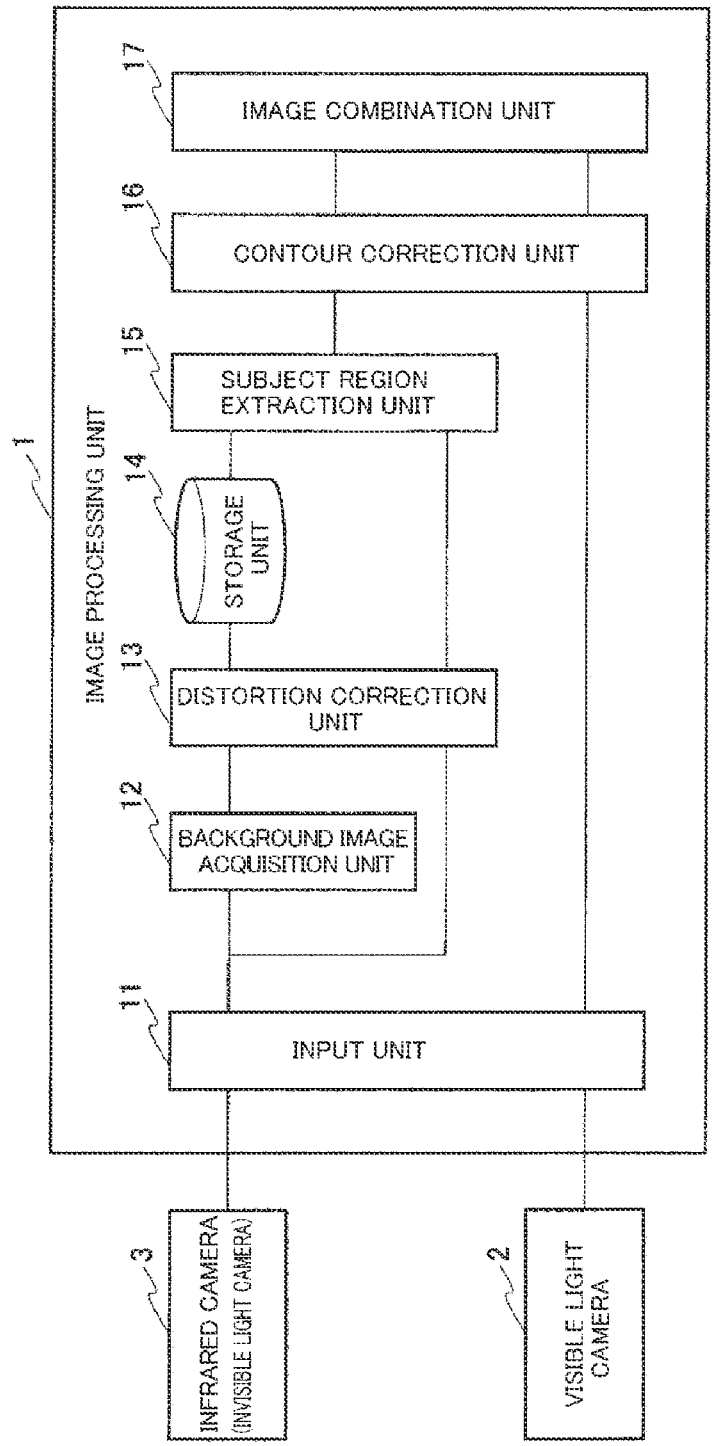
FIG. 2 is a functional block diagram illustrating functions of an image processing device.

FIG. 2 is a block diagram illustrating a configuration of the image processing device 1 according to the embodiment.

The illustrated image processing device 1 includes an input unit 11, a background image acquisition unit 12, a distortion correction unit 13, a storage unit 14, a subject region extraction unit 15, a contour correction unit 16, and an image combination unit 17.

The input unit 11 inputs infrared images captured by the infrared camera 3 and visible light images captured by the visible light camera 2. The infrared images input to the input unit 11 include a background infrared image of only a background in which a subject is not included (a first invisible light image) and an infrared image in which the subject and a background are included (a second invisible light image). The visible light images input to the input unit 11 include a visible light image in which the subject and the background are included (a second visible light image). The visible light images input to the input unit 11 may include a background visible light image of only the background in which the subject is not included (a first visible light image).

The background image acquisition unit 12 acquires the background infrared image among the infrared images input to the input unit 11, performs distortion correction processing, and subsequently stores the processed background infrared image in the storage unit 14. The distortion correction unit 13 corrects at least one of the infrared image and the visible light image so that pixels at the same coordinates of the infrared image and the visible light image portray the same target in the real space.

The subject region extraction unit 15 calculates a difference between a pixel value of each pixel of the infrared image and a pixel value of a corresponding pixel of the background infrared image, determines whether the pixel is in a subject region or a background region in accordance with whether the difference is equal to or greater than a predetermined threshold, and extracts the subject region from the infrared image.

The contour correction unit 16 reclassifies each pixel of a boundary between the background region and the subject region extracted by the subject region extraction unit 15 to the subject region or the background region by using the visible light image captured at the same timing as the infrared image and corrects the contour of the subject region. The image combination unit 17 extracts the subject region corrected by the contour correction unit 16 from the visible light image to generate an extracted image.

The infrared image and the visible light image are images captured in an environment in which the infrared lamps 4 are disposed so that the invisible light is radiated to the background and the invisible light is not radiated to the subject, as illustrated in FIG. 1.

Next, processing of the image processing device 1 according to the embodiment will be described.

Figure 3:
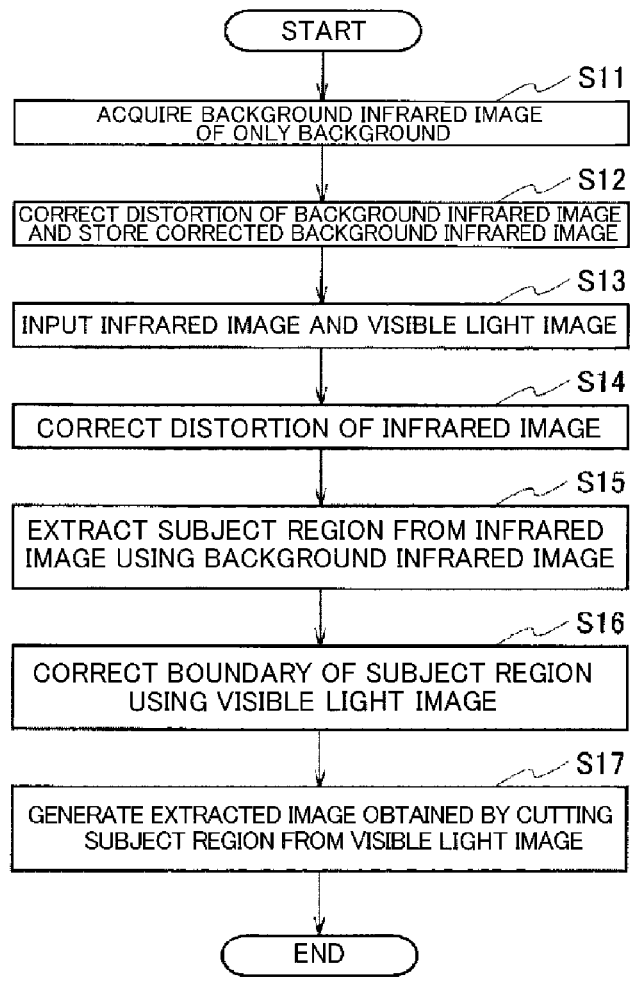
FIG. 3 is a flowchart illustrating subject extraction processing.

FIG. 3 is a flowchart illustrating processing of the image processing device 1. When the infrared images and the visible light images are continuously input as moving images to the image processing device 1, processing of S13 to S17 of FIG. 3 is assumed to continue repeatedly for each frame. The infrared lamps 4 stay on to radiate the infrared light to the background while the processing of FIG. 3 is performed.

First, the background image acquisition unit 12 acquires, as a background infrared image, the infrared image of only the background in which the subject (foreground) is not included among the infrared images input to the input unit 11 (S11). Then, the background image acquisition unit 12 stores the acquired background infrared image in the storage unit 14 after distortion correction processing of S12.

The background infrared image is acquired at, for example, a timing instructed by an operator (a user). The operator first inputs an instruction to acquire a background image to the image processing device 1 via an operation interface unit (not illustrated) in a state in which there is no subject in front of the camera. Thus, the background image acquisition unit 12 acquires the background infrared image among the input infrared images and retains the background infrared image in the storage unit 14 after the distortion correction. Thereafter, when infrared images are input as moving images in a state in which a subject desired to be extracted enters in front of the background, subsequent processing of S13 to S17 is performed for each frame. When the infrared image is input as a still image, processing of S13 to S17 is performed on one infrared image.

The distortion correction unit 13 corrects a disparity between the visible light camera 2 and the infrared camera 3 (S12). In the embodiment, as illustrated in FIG. 1, the visible light camera 2 and the infrared camera 3 are disposed close so that optical axes are parallel. Therefore, although the same target is imaged, a discrepancy in a position occurs between the visible light image captured by the visible light camera 2 and the infrared image captured by the infrared camera 3.

Therefore, the distortion correction unit 13 corrects (modifies) at least one of the visible light image and the infrared image so that pixels at the same coordinates in the infrared image and the visible light image portray the same target in the real space. When the image cannot be transformed so that all the pixels portray the same target in the real space, the image is transformed so that the distortion is as little as possible. In the example illustrated in FIG. 3, only the infrared image is corrected.

In the embodiment, the distortion correction unit 13 corrects the infrared image using projective transformation acquired in advance. Specifically, a calibration pattern is set at an assumed subject position. Then, each of the visible light camera 2 and the infrared camera 3 images a calibration pattern and inputs the imaged calibration pattern to the image processing device 1. Each of the visible light image and the infrared image in which the calibration pattern is imaged may be one still image. Then, the distortion correction unit 13 calculates a projective transformation formula so that the calibration pattern of the infrared image captured by the infrared camera 3 overlaps the calibration pattern of the visible light image captured by the visible light camera 2. The distortion correction unit 13 corrects (performs projective transformation on) the background infrared image using the projective transformation formula. The corrected background infrared image is stored in the storage unit 14 by the background image acquisition unit 12.

Subsequently, the input unit 11 inputs the infrared image output from the infrared camera 3 and the visible light image output from the visible light camera 2 to the distortion correction unit 13 (S13). The infrared image and the visible light image are images in which the same targets (the subject and the background) are each imaged at the same timing.

Then, the distortion correction unit 13 corrects the input infrared image using the projective transformation as in S12 (S14). In the example illustrated in FIG. 3, the visible light image is not corrected.

The subject region extraction unit 15 extracts the subject region from the infrared image corrected in S14 using the corrected background infrared image stored in the storage unit 14 (S15). Here, the subject region extraction unit 15 performs background differentiation between the infrared image and the background infrared image. Specifically, the subject region extraction unit 15 calculates a difference between a pixel value of each pixel of the infrared image and a pixel value of the corresponding pixel (the pixel at the same position) of the background infrared image. Then, the subject region extraction unit 15 determines whether the pixel is in the subject region or the background region in accordance with whether the difference is equal to or greater than the predetermined threshold and extracts the subject region from the infrared image.

That is, when the difference is equal to or greater than the predetermined threshold, the subject region extraction unit 15 determines that the pixel is in the subject region (belongs to the subject region). When the difference is less than the threshold, the subject region extraction unit 15 determines that the pixel is in the background region (belongs to the background region). The subject region extraction unit 15 acquires the subject region by performing such determination processing on all the pixels of the infrared image and the background infrared image.

The differentiation in the embodiment is not simple subtraction but weighted squared error. When a pixel value of the infrared image is (Fi), a pixel value of the background infrared image is (Bi), and a weighted coefficient is (Wi), a weighted squared error (difference) is Wi×(Fi-Bi)×(Fi-Bi).

In the embodiment, as illustrated in FIG. 1, the infrared lamps 4 radiate the infrared light to the background and do not directly radiate the infrared light to the subject. That is, by causing the infrared lamps 4 to radiate the infrared light to only the background, it is possible to assign information serving as a cue for clearly separating the subject from the background to the subject and the background without affecting scenery which an observer sees. Here, the observer is a person who is a subject, a spectator who sees an extraction result of the subject, or the like. The information serving as the cue for clearly separating the subject from the background is a marking by infrared light, in particular, light and shade.

Figure 4:
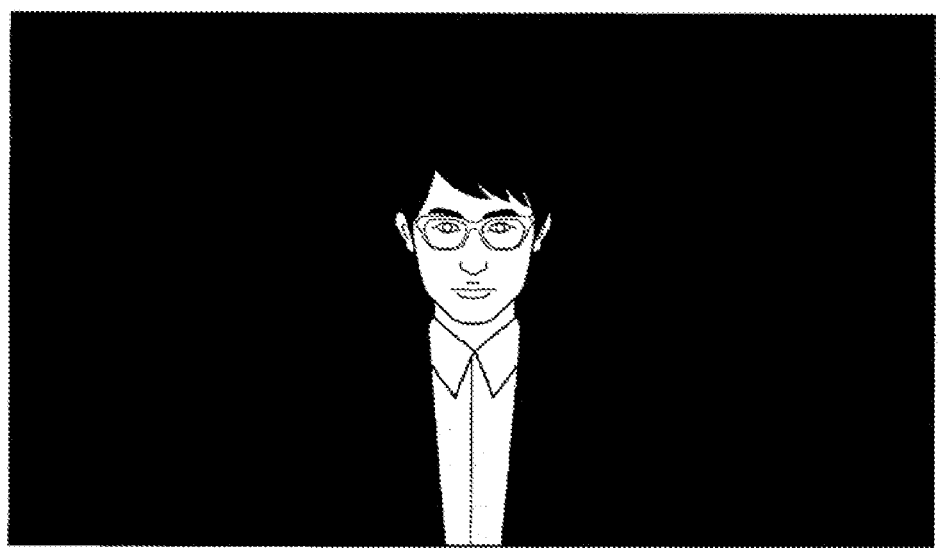
FIG. 4 is a diagram illustrating an example of a visible light image.

FIG. 4 is a diagram illustrating an example of a visible light image. In the illustrated example, the upper half of a person who wears a black suit is shown in front of a black background. Since the background, the suit, and the hair are black, it is difficult to extract a subject region using the color.

Figure 5:
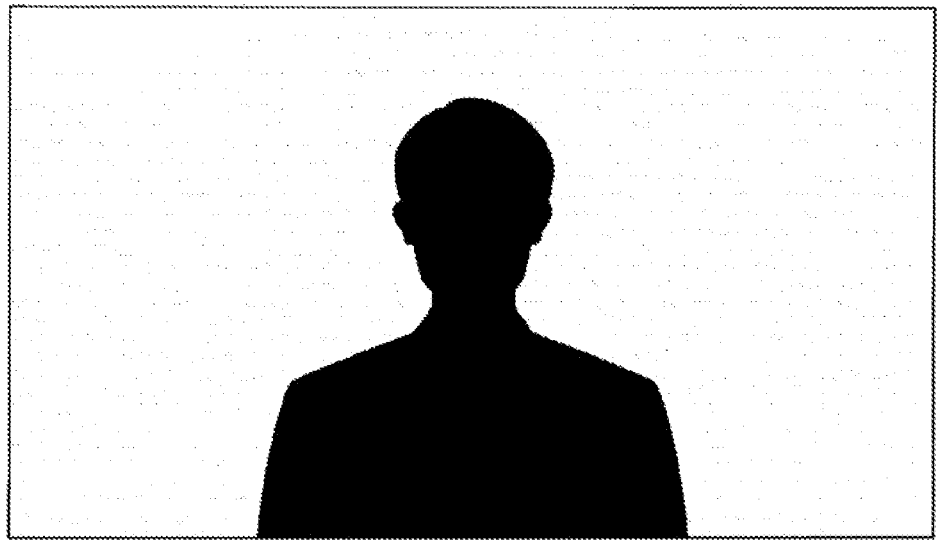
FIG. 5 is a diagram illustrating an example of an infrared image.

FIG. 5 illustrates an example of an infrared image of the same targets as those of FIG. 4 captured by the infrared camera 3. The infrared image is expressed with grayscales and binary values in accordance with intensity (luminance) of the infrared light. In the illustrated infrared image, the background region irradiated with the infrared light has a light color (herein, white) because its luminance is high. The subject region (a person) not irradiated with the infrared light has a deep color (herein, black) because its luminance is low. In this way, in the infrared image, a difference is large between the pixel values of the background region and the pixel values of the subject region. Because the background infrared image is an image of only the background region irradiated with the infrared light, the luminance of the entire image is high and the entire image is displayed with a light color.

In the embodiment, by using the infrared image, it is possible to reliably extract the subject region even when it is difficult to determine the background and the subject in the visible light image.

The subject region extraction unit 15 outputs the extracted subject region to the contour correction unit 16. The subject region output to the contour correction unit 16 is information for identifying the subject region in the infrared image (or the visible light image). The subject region is, for example, information (a set of coordinates or the like) indicating positions of the pixels of the subject region or a binarized image in which the pixels of the subject region and the background region are binarized.

The contour correction unit 16 corrects the subject region using the subject region extracted in S15 and the visible light image input by the input unit 11 in S13 (S16). The visible light image is an image in which the same targets (the subject and the background) are imaged at the same timing as the infrared image input in S13. In the embodiment, each pixel of a boundary between the subject region and the background region is reclassified to the subject region or the background region using the visible light image, and the contour of the subject region is corrected. That is, boundary elaboration is performed on the boundary of the extracted subject region by segmentation and the subject region is corrected to improve the precision of the subject region.

In the segmentation, the contour correction unit 16 sets a boundary region with a preset width including both of the subject region and the background region in the visible light image as a contour of the subject region. Then, the contour correction unit 16 reclassifies a pixel of interest to the subject region or the background region by comparing a pixel value of each pixel (the pixel of interest) in the contour with a pixel value of a peripheral pixel of the pixel of interest. Specifically, the contour correction unit 16 calculates an evaluation value using a difference between the pixel values of the pixel of interest and the peripheral pixel and a difference (a distance) between coordinates of the pixel of interest and the peripheral pixel. The contour correction unit 16 reclassifies the pixel of interest to the subject region when the peripheral pixel with the smallest evaluation value is the subject region. The contour correction unit 16 reclassifies the pixel of interest to the background region when the peripheral pixel with the smallest evaluation value is the background region.

The contour correction unit 16 can improve the extraction precision of a contour portion in which erroneous extraction easily occurs using the background differentiation of S15 by considering continuity of the pixel values (color) with the peripheral pixels in this way. The contour correction unit 16 corrects the contour of the subject region as the result of the reclassification and outputs the corrected subject region to the image combination unit 17.

The corrected subject region, and the visible light image input by the input unit 11 in S13, are input to the image combination unit 17. Then, the image combination unit 17 generates an extracted image in which only the subject region is extracted from the visible light image (S17). The extracted image is an image in which only the subject is cut from the visible light image.

Figure 6:
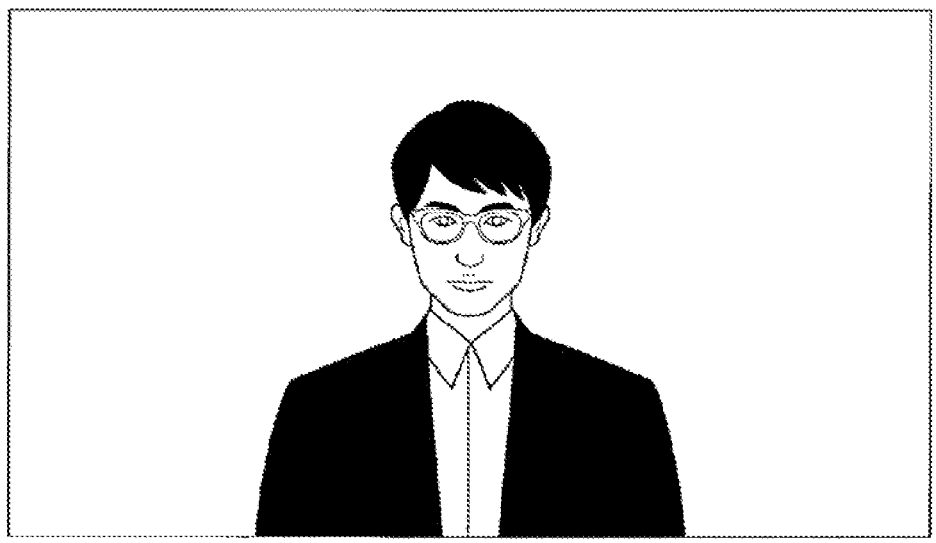
FIG. 6 is a diagram illustrating an example of an extracted image.

FIG. 6 illustrates an example of the extracted image. The image combination unit 17 reflects the pixel values of the visible light image in the extracted image with regard to the subject region, and sets pixel values of a predetermined color in the extracted image with regard to the background region other than the subject region. In the extracted image illustrated in FIG. 6, pixel values of the color white are set in the pixels of the background region.

The above-described flowchart of FIG. 3 is exemplary and may be modified as follows.

Modification Example 1

In the subject region extraction processing (S15) of FIG. 3, the subject region extraction unit 15 may change (adjust) the predetermined threshold used for the background differentiation between the infrared image and the background infrared image in accordance with the intensity of the infrared light radiated from the infrared lamps 4. Specifically, the subject region extraction unit 15 also increases the threshold when the intensity of the infrared light is large. That is, the threshold is set to be larger in proportion to the intensity of the infrared light. For example, when the infrared lamps 4 are adjusted to increase the intensity of the infrared light and the pixel values of the background region of the infrared image double in brightness, the change in the pixel values in the subject region is also relatively doubled. As a result, the difference value between the pixel values of the infrared image and the background infrared image is also considered to be doubled. Therefore, by doubling the threshold, it is possible to keep the threshold appropriate for the extraction of the subject region.

Modification Example 2

In the subject region extraction processing (S15) of FIG. 3, the subject region has been extracted using the infrared image and the background infrared image. However, the subject region may be extracted further using the visible light image and the background visible light image. In this case, in S11 of FIG. 3, the background image acquisition unit 12 acquires the visible light image of only the background as the background visible light image among the visible light images input to the input unit 11 in addition to the background infrared image and stores the background visible light image in the storage unit 14.

The subject region extraction unit 15 uses pixel values of n+1 dimensions in which the pixel values of n dimensions of the visible light image and a pixel value (grayscale) of 1 dimension of the infrared image are integrated. Here, the subject region extraction unit 15 generates, as a background image, a background extended image with pixel values of 4 dimensions in which pixel values (3 dimensions of RGB) of the background visible light image and a pixel value (1 dimension of grayscale) of the corresponding pixel of the background infrared image are integrated. Similarly, the subject region extraction unit 15 generates, as an input image from which the subject is extracted, an extended image with pixel values of 4 dimensions in which pixel values (3 dimensions) of the visible light image and a pixel value (1 dimension) of the corresponding pixel of the infrared image are integrated. RGB are three primary colors of red, green, and blue.

Then, the subject region extraction unit 15 performs background differentiation between the generated extended image and the background extended image. That is, the subject region extraction unit 15 calculates a difference between the pixel value of each pixel of the extended image and a pixel value of the corresponding pixel of the background extended image. Then, the subject region extraction unit 15 determines whether the pixel is in the subject region or the background region in accordance with whether the difference is equal to or greater than the predetermined threshold and extracts the subject region from the extended image. Specifically, when the difference is equal to or greater than the predetermined threshold, the pixel is determined to be in the subject region. When the difference is less than the threshold, the pixel is determined to be in the background region. All the pixels are determined to acquire the subject region.

At this time, as an evaluation function (threshold) of the difference used in the background differentiation, for example, the following weighted squared error expressed as follows may be set when the pixel values of the extended image are (Fr, Fg, Fb, Fi) and the pixel values of the background extended image are (Br, Bg, Bb, Bi). Wr, Wg, Wb, and Wi are weighted coefficients.

Wr×(Fr-Br)×(Fr-Br)+Wg×(Fg-Bg)×(Fg-Bg)+Wb×(Fb-Bb)×(Fb-Bb)+Wi×(Fi-Bi)×(Fi-Bi)

The advantage that the extended image and the background extended image are used in this way is that the subject can be extracted even when the pixel values of the subject of the infrared image are the same as the pixel values of the corresponding pixels of the subject of the background infrared image. For example, when values of Fi and Bi are the same, the subject cannot be extracted despite performing the background differentiation between only the infrared image and the background infrared image. However, when the extended image and the background extended image are used and there are differences equal to or greater than the threshold between (Fr, Fg, Fb) and (Br, Bg, Bb), the subject can be separated. As a result, the subject can be extracted. Instead of the background differentiation method, region division or class classification may be applied.

Modification Example 3

In the contour correction processing (segmentation) of S16 in FIG. 3, the contour correction unit 16 may adjust the number of peripheral pixels and a pattern of a selection range of the peripheral pixels to be used in accordance with "the pixel values of the infrared image", "the difference values between the pixel values of the infrared image and the corresponding pixel values of the background infrared image", or "the evaluation value calculated using both the pixel values of the infrared image and the difference values". The pattern of the peripheral pixels is, for example, a selection pattern of the peripheral pixels such as whether pixels in a relatively narrow range are selected at a high density from pixels of interest or whether pixels in a relatively large range are selected at a low density from the pixels of interest.

For example, when pixels have large pixel values of the infrared image (pixels have high luminance), a likelihood of the pixel being in the background region can be said to be high. When the pixels have large difference values, a likelihood of the pixel being in the subject region can be said to be high. For the pixels which are determined to be highly likely to be in the subject region or the background region, a calculation amount necessary for segmentation can be reduced by reducing the number of peripheral pixels.

Modification Example 4

In the contour correction processing (segmentation) of S16 in FIG. 3, the contour correction unit 16 may adjust the above-described boundary region with the predetermined width using the infrared image and the background infrared image. For example, when the difference between the pixel value of the infrared image and the corresponding pixel value of the background infrared image with regard to each pixel of the boundary region with the predetermined width is less than a predetermined first threshold, the contour correction unit 16 classifies the pixel into a background pixel. When the difference is at least the first threshold and not more than the second threshold, the pixel is classified into a boundary pixel. When the difference is greater than the second threshold, the pixel is classified into a subject pixel (where the first threshold<the second threshold). A relation between the first and second thresholds and the predetermined threshold used in the subject region extraction processing (S15) in FIG. 3 is that the first threshold<the predetermined threshold<the second threshold.

Each pixel classified into the subject pixel and the background pixel is a pixel which is highly likely to be in the subject region or the background region. Accordingly, such a pixel is confirmed to be in the subject region or the background region without performing segmentation. On the other hand, each pixel classified into a boundary pixel is a pixel which is less likely to be in the subject region or the background region. Therefore, the contour correction unit 16 may perform segmentation on only each pixel classified into the boundary pixel from the boundary region with the predetermined width and perform boundary correction on the subject region. Thus, it is possible to reduce a calculation amount necessary for the segmentation.

When the difference is less than the first threshold, the contour correction unit 16 may classify all the pixels of the infrared image to the background pixel without providing the boundary region with the predetermined width. When the difference is at least the first threshold and not more than the second value, the pixels may be classified into the boundary pixels. When the difference is greater than the second threshold, the pixels may be classified into the subject pixels and a region to which each of the boundary pixels belongs may be set as a boundary region, the segmentation may be performed on each pixel of the boundary region and the boundary correction of the subject region may be performed. Thus, even when the boundary correction by the segmentation is in a range broader than the predetermined width, the segmentation can be performed without limiting the predetermined width. Thus, it is possible to prevent the boundary correction from being omitted.

Modification Example 5

In the flowchart of FIG. 3, the image processing device 1 has extracted the subject region of S15 and has subsequently corrected the contour of the subject region extracted in S16. However, the image processing device 1 may generate the extracted image of S17 using the subject region extracted in S15 without performing the contour correction of S16.

Modification Example 6

In the flowchart of FIG. 3, the image processing device 1 has generated the extracted image in S17. However, the image processing device 1 may output region information regarding the subject region after the contour correction of S16 or region information regarding the subject region of S15 without performing the contour correction.

The plurality of modification examples may be combined.

The image processing device 1 according to the above-described embodiments calculates a difference between a pixel value of each pixel of an infrared image and a pixel value of a corresponding pixel of a background infrared image, determines whether the pixel is in the subject region or the background region in accordance with whether the difference is equal to or greater than the predetermined threshold, and extracts the subject region from the infrared image. The infrared image and the background infrared image are images captured in an environment in which the infrared lamp 4 is disposed so that invisible light is radiated to the background and the invisible light is not radiated to the subject.

Thus, in the embodiment, it is possible to inhibit deterioration of extraction precision of a subject and reliably extract the subject even when the colors of the subject and the background are the same or similar. That is, in the embodiment, by using the infrared image, it is possible to reliably extract the subject region even when it is difficult to determine the subject and the background in the visible light image.

In the above-described image processing device 1, for example, a general computer system can be used that include a central processing unit (CPU), a memory, a storage (a hard disk drive (HDD) or a solid state drive (SSD)), a communication device, an input device, and an output device. In the computer system, each function of the image processing device 1 is realized when the CPU executes a program for the image processing device 1 loaded on the memory. The program for the image processing device 1 can be stored on a computer-readable recording medium such as an HDD, an SSD, a USB memory, a CD-ROM, a DVD-ROM, or an MO and can also be delivered via a network.

The present invention is not limited to the foregoing embodiments and can be modified in many forms within the scope of the gist of the present invention.

For example, in the foregoing embodiment, the visible light camera 2 and the infrared camera 3 have been disposed so that optical axes are parallel. However, a spectroscopic instrument typified by a half mirror, a dichroic prism, or the like may be used so that the visible light camera 2 and the infrared camera 3 are disposed on the same axis. By configuring an image sensor with a multiple plate configuration ("RGB1" plate+an IR1 plate, ""RGB3" plate+IR1 plate", or the like), a visible light image and an infrared image may be simultaneously captured using one camera. IR is infrared light.

By controlling filter characteristics on an image sensor such as a CCD or a CMOS, visible light and invisible light may be imaged by the same image sensor. That is, instead of the visible light camera 2 and the infrared camera 3, a visible light image and an infrared image may be simultaneously captured using one camera in which four types of filters of R, G, B, and IR are arrayed on one plate of a CCD/CMOS (an image sensor). When the visible light image and the infrared image may be imaged simultaneously using one camera, the processing of the distortion correction unit 13 is not necessary.

As a substitute for the infrared lamp 4, the sun may be used in the case of a background such as an outdoor scenery at which sunlight arrives.

REFERENCE SIGNS LIST

1 Image processing device
11 Input unit
12 Background image acquisition unit
13 Distortion correction unit
14 Storage unit
15 Subject region extraction unit
16 Contour correction unit
17 Image combination unit
2 Visible light camera
3 Infrared camera
4 Infrared lamp
5 Background
6 Subject

The invention claimed is:

1. An image processing device comprising:
an input unit, including one or more processors, configured to input a first invisible light image of only a background in which a subject is not included and a second invisible light image in which the subject and the background are included; and
a subject region extraction unit, including one or more processors, configured to calculate a difference between a pixel value of each pixel of the second invisible light image and a pixel value of a corresponding pixel of the first invisible light image, determine whether the pixel is in a subject region or a background region in accordance with whether the difference is equal to or greater than a predetermined threshold, and extract the subject region from the second invisible light image, wherein the first and second invisible light images are images captured in an environment in which an invisible light irradiation device is disposed so that invisible light is radiated to the background and the invisible light is not radiated to the subject.

2. The image processing device according to claim 1,
wherein the input unit is configured to input a first visible light image of only the background in which the subject is not included and a second visible light image which is captured at the same timing as the second invisible light image and in which the subject and the background are included,
wherein the subject region extraction unit is configured to generate a first extended image that includes pixel values of n+1 dimensions in which pixel values of n dimensions of the first visible light image and a pixel value of one dimension of the first invisible light image are integrated and is configured to generate a second extended image that includes pixel values of n+1 dimensions in which pixel values of n dimensions of the second visible light image and a pixel value of one dimension of the second invisible light image are integrated, and wherein the subject region extraction unit is configured to calculate a difference between a pixel value of each pixel of the second extended image and a pixel value of a pixel at a corresponding position of the first extended image, determine whether the pixel is in the subject region or the background region in accordance with whether the difference is equal to or greater than the predetermined threshold, and extract the subject region from the second extended image.

3. The image processing device according to claim 1,
wherein the input unit is configured to input a second visible light image which is captured at the same timing as the second invisible light image and in which the subject and the background are included, and
wherein the image processing device further comprises a contour correction unit, including one or more processors, configured to reclassify each pixel of a boundary between the subject region and the background region to the subject region or the background region using the second visible light image and corrects a contour of the subject region.

4. The image processing device according to claim 3, wherein the contour correction unit is configured to adjust a number of peripheral pixels used in the reclassification or a selection pattern of the peripheral pixels in accordance with the pixel value of each pixel of the second invisible light image, the difference, or an evaluation value calculated using the pixel value and the difference.

5. The image processing device according to claim 3, wherein the contour correction unit is configured to set a region as the background region when the difference of each pixel of the second invisible light image is less than a first threshold (where the first threshold is less than the predetermined threshold), set a pixel as a boundary pixel when the difference is at least the first threshold and not more than a second threshold (where the first threshold is less than the predetermined threshold, which is less than the second threshold), set a region as the subject region when the difference is greater than the second threshold, reclassify only the boundary pixel to the subject region or the background region using the second visible light image, and correct a contour of the subject region.

6. The image processing device according to claim 1, wherein the image processing device is included in an image processing system and the invisible light irradiation device is disposed so that the invisible light is radiated to the background and the invisible light is not radiated to the subject.

7. An image processing method performed by an image processing device, the method comprising:
inputting a first invisible light image of only a background in which a subject is not included and a second invisible light image in which the subject and the background are included;
calculating a difference between a pixel value of each pixel of the second invisible light image and a pixel value of a corresponding pixel of the first invisible light image; and
determining whether the pixel is in a subject region or a background region in accordance with whether the difference is equal to or greater than a predetermined threshold, and extracting the subject region from the second invisible light image, wherein the first and second invisible light images are images captured in an environment in which an invisible light irradiation device is disposed so that invisible light is radiated to the background and the invisible light is not radiated to the subject.

8. A non-transitory computer readable medium storing one or more instructions causing a computer to function as an image processing device to execute:
inputting a first invisible light image of only a background in which a subject is not included and a second invisible light image in which the subject and the background are included;
calculating a difference between a pixel value of each pixel of the second invisible light image and a pixel value of a corresponding pixel of the first invisible light image; and determining whether the pixel is in a subject region or a background region in accordance with whether the difference is equal to or greater than a predetermined threshold, and extracting the subject region from the second invisible light image, wherein the first and second invisible light images are images captured in an environment in which an invisible light irradiation device is disposed so that invisible light is radiated to the background and the invisible light is not radiated to the subject.

9. The image processing method according to claim 7, further comprising:
inputting a first visible light image of only the background in which the subject is not included and a second visible light image which is captured at the same timing as the second invisible light image and in which the subject and the background are included;
generating a first extended image that includes pixel values of n+1 dimensions in which pixel values of n dimensions of the first visible light image and a pixel value of one dimension of the first invisible light image are integrated;
generating a second extended image that includes pixel values of n+1 dimensions in which pixel values of n dimensions of the second visible light image and a pixel value of one dimension of the second invisible light image are integrated;
calculating a difference between a pixel value of each pixel of the second extended image and a pixel value of a pixel at a corresponding position of the first extended image;
determining whether the pixel is in the subject region or the background region in accordance with whether the difference is equal to or greater than the predetermined threshold; and
extracting the subject region from the second extended image.

10. The image processing method according to claim 7, further comprising:
inputting a second visible light image which is captured at the same timing as the second invisible light image and in which the subject and the background are included; and
reclassifying each pixel of a boundary between the subject region and the background region to the subject region or the background region using the second visible light image and corrects a contour of the subject region.

11. The image processing method according to claim 10, further comprising:
adjusting a number of peripheral pixels used in the reclassification or a selection pattern of the peripheral pixels in accordance with the pixel value of each pixel of the second invisible light image, the difference, or an evaluation value calculated using the pixel value and the difference.

12. The image processing method according to claim 10, further comprising:
setting a region as the background region when the difference of each pixel of the second invisible light image is less than a first threshold (where the first threshold is less than the predetermined threshold);
setting a pixel as a boundary pixel when the difference is at least the first threshold and not more than a second threshold (where the first threshold is less than the predetermined threshold, which is less than the second threshold);
setting a region as the subject region when the difference is greater than the second threshold;
reclassifying only the boundary pixel to the subject region or the background region using the second visible light image; and
correcting a contour of the subject region.

13. The non-transitory computer readable medium according to claim 8, wherein the one or more instructions further cause the computer to execute:
inputting a first visible light image of only the background in which the subject is not included and a second visible light image which is captured at the same timing as the second invisible light image and in which the subject and the background are included;
generating a first extended image that includes pixel values of n+1 dimensions in which pixel values of n dimensions of the first visible light image and a pixel value of one dimension of the first invisible light image are integrated;
generating a second extended image that includes pixel values of n+1 dimensions in which pixel values of n dimensions of the second visible light image and a pixel value of one dimension of the second invisible light image are integrated;
calculating a difference between a pixel value of each pixel of the second extended image and a pixel value of a pixel at a corresponding position of the first extended image;
determining whether the pixel is in the subject region or the background region in accordance with whether the difference is equal to or greater than the predetermined threshold; and extracting the subject region from the second extended image.

14. The non-transitory computer readable medium according to claim 8, wherein the one or more instructions further cause the computer to execute:
inputting a second visible light image which is captured at the same timing as the second invisible light image and in which the subject and the background are included; and
reclassifying each pixel of a boundary between the subject region and the background region to the subject region or the background region using the second visible light image and corrects a contour of the subject region.

15. The non-transitory computer readable medium according to claim 14, wherein the one or more instructions further cause the computer to execute:
adjusting a number of peripheral pixels used in the reclassification or a selection pattern of the peripheral pixels in accordance with the pixel value of each pixel of the second invisible light image, the difference, or an evaluation value calculated using the pixel value and the difference.

16. The non-transitory computer readable medium according to claim 14, wherein the one or more instructions further cause the computer to execute:
setting a region as the background region when the difference of each pixel of the second invisible light image is less than a first threshold (where the first threshold is less than the predetermined threshold);
setting a pixel as a boundary pixel when the difference is at least the first threshold and not more than a second threshold (where the first threshold is less than the predetermined threshold, which is less than the second threshold);
setting a region as the subject region when the difference is greater than the second threshold;
reclassifying only the boundary pixel to the subject region or the background region using the second visible light image; and
correcting a contour of the subject region.

* * * * *